Nov. 10, 1942.      P. SADTLER ET AL      2,301,457
MAGNESIUM EXTRACTION PROCESS
Filed Nov. 22, 1938
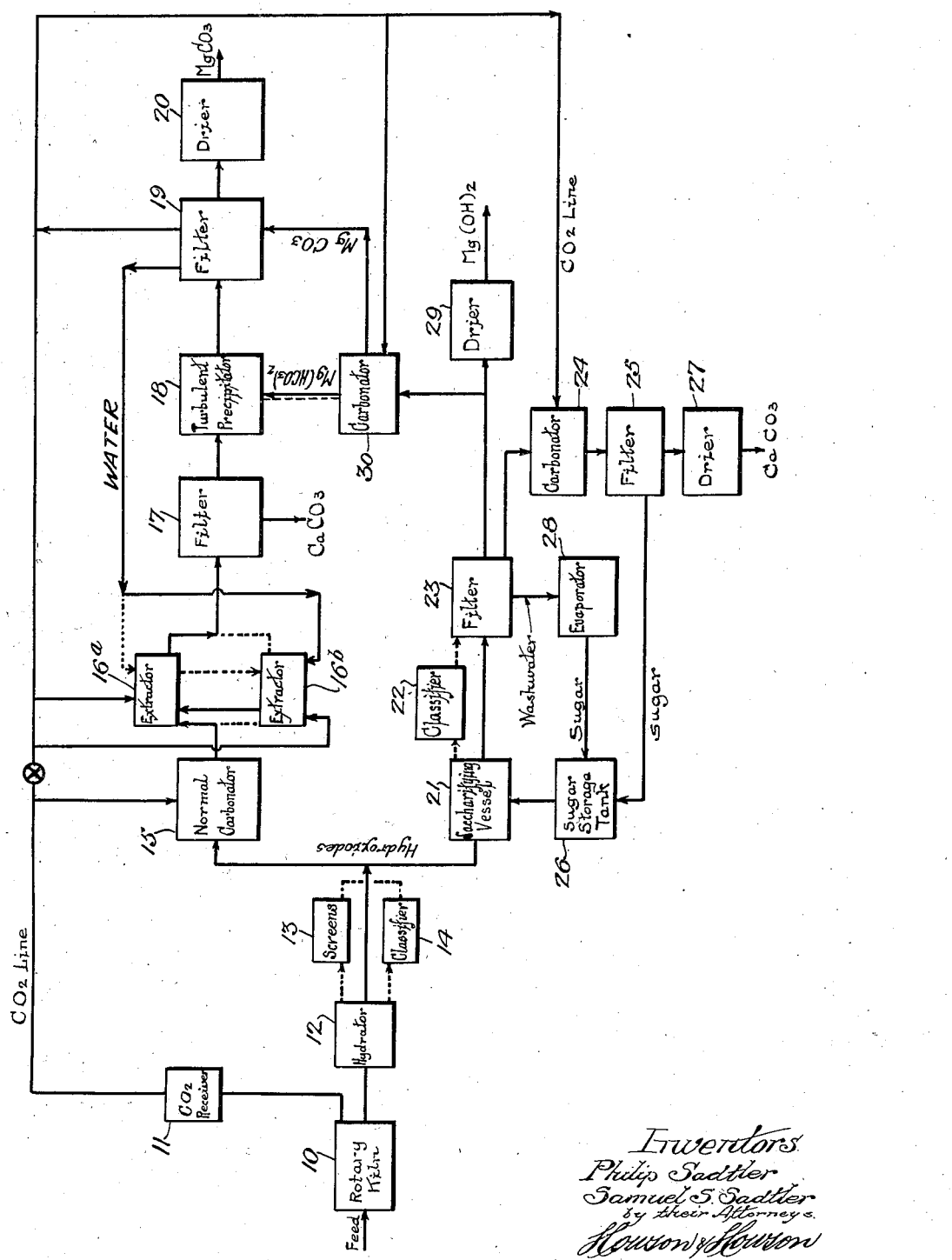

Patented Nov. 10, 1942

2,301,457

UNITED STATES PATENT OFFICE 2,301,457

MAGNESIUM EXTRACTION PROCESS

Philip Sadtler and Samuel S. Sadtler, Chestnut Hill, Pa., assignors to Samuel P. Sadtler & Son, Inc., Philadelphia, Pa., a corporation of Pennsylvania Application November 22, 1938, Serial No. 241,852

6 Claims. (Cl. 23—66)

This invention relates to a process for the production of magnesium compounds from dolomite, magnesite, and other oxide and carbonate mixtures of magnesium and other elements, and has for an important object thereof provision of a process which will enable such a substantial reduction in the cost of the compounds obtained as to make them competitive with sodium compounds at present employed in lieu thereof.

Another object of the invention is the provision of a process enabling the practical production of commercially pure calcium compounds as a by-product in the production of magnesium compounds from such materials as dolomite, and thereby eliminate the large waste piles.

Other objects of the invention are to provide an increase in the salable products obtainable from dolomite, and particularly an increase of the magnesium compound yield therefrom; the production of commercially acceptable calcium salts, and the production of magnesia suitable for use in dead burnt refractories, and for the production of magnesium metal and salts.

A further object of the invention is to make the magnesium compounds of greater purity than is now practical by carbon dioxide separation of calcium compounds from magnesium compounds.

A further object of this process is to provide a method for the production of normal magnesium carbonate by precipitation of this compound from magnesium-containing liquors.

These and other objects are attained by treatment of dolomitic lime by the processes illustrated in the accompanying drawing, in which the drawing diagrammatically shows the various steps of the production of magnesium compounds and their by-products in accordance with our invention.

Our invention is based on the use of uniformly burned dolomite or other ores such as magnesite, brucite, etc., which produce magnesium oxide on heating. If the raw material contains an appreciable amount of iron and other impurities, the ore may be purified by flotation methods. The invention is best carried out in a rotary kiln, or other continuous flowing kilns, fired by powdered coal or gas, which burns stone smaller than three inches in diameter. A kiln with a continuous feed and discharge allows the rate of flow to be controlled so that a flame of high temperature may be used but the ore moved by so rapidly that it does not acquire the temperature of the flame, and hence the formation of dead burned magnesium oxide is avoided.

In the process diagrammatically illustrated in Figure 1, the ore, preferably of substantially uniform size, is burned in a rotary kiln 10 to an extent to produce a uniform product containing substantially no dead burned or unburned material. The temperature to which the material is subjected in the rotary kiln depends upon the raw material employed, but in general is sufficient to convert all or substantially all of the magnesium compound into magnesium oxide. Hence a temperature of at least 350° C. must be imparted to the ore for a sufficient time to liberate the carbon dioxide when the ore contains magnesium carbonate. In the case of dolomite and other ores containing both magnesium and calcium carbonate, the ore is preferably subjected to a sufficient temperature to remove at least a portion of the carbon dioxide from the calcium carbonate, and in general the temperature will be sufficient to remove all or substantially all of the carbon dioxide therefrom. As previously stated, the burning is conducted so that the resulting burned product is free or substantially free of dead burned magnesium oxide.

Heretofore, in the production of magnesia from dolomitic or magnesium limestones, a shaft kiln has been used, since by the use of this apparatus the stones can be hand-picked and only those high in magnesia placed in the kiln. Furthermore, the shaft type of kiln has been employed for the burning of ore because it is the cheapest type of apparatus to employ and because its use results in the production of a gas as a by-product which is high in carbon dioxide and in the production of a product to which ash and the like had not been added during the processing. A further reason for the use of the shaft kiln resides in the fact that it is possible after the burning to remove the large pieces of burned product by hand-picking and thereby separate them from coal ashes and other contaminants. Our invention departs from this practice in spite of its apparent advantages. As before stated, the burning step is carried out in a rotary or other continuous flowing kiln wherein the formation of dead burned magnesium oxide and unburned cores is eliminated, which products invariable result when a shaft kiln is employed. It has been found that the elimination of the dead burned magnesium oxide from the product of the process of the present invention outbalances the cited factors in favor of the use of a shaft kiln. Any ash added to the product by powdered coal, if that material is used as a fuel, is removed from the product by classification and, therefore, does not interfere with the separation of the magnesia by the process. The use of the rotary or other continuous flowing kiln permits the control of the temperature of burning so that the rate of hydration will be at the maximum and the resulting hydrated product will be of the most desirable form. By the use of such a burning step, the product is lightly burned, and, as is known, the more lightly the product is burned (and the greater the rate of hydration) the lighter and finer will be the hydrated powder produced. A lightly burned lime will produce a very fine, bulky hydrated powder free from gritty lumps, or with excess water a smooth paste, whilst the same lime overburned furnishes a heavy, lumpy hydrated powder and a harsh paste without the unctuous feeling of the paste from the properly burned lime.

The carbon dioxide driven off in the burning operation is collected, as in receiver 11, for subsequent use in the process if desired, while the burned material from the kiln is hydrated as at 12 in any suitable manner to result in substantially complete hydration of the magnesium oxide. Complete formation of the magnesium hydroxide from the burned material must be carried out, since otherwise the hydroxides will not be completely formed and an appreciable part of the magnesia will not be extracted. Preferably, the burned material will be added to the water to be used for the hydration and generally the amount of water employed will be such that the temperature of the mixture will exceed about 75° C., and will preferably be between 85° C. and 100° C. Usually the water employed in the case of burned dolomite will be one and one-half times the weight of the burned material. During the addition of the burned material to the water, the mixture is agitated to prevent local overheating. The temperature mentioned is maintained and the agitation is continued until the hydration of the oxides is substantially complete, and this may be finished by aging for one hour or more, even up to two days. During the first hour or so of aging, the temperature is preferably maintained at 75° C. to 100° C. If the amount of water employed corresponds to that required to give the designated temperature of the mixture, the resulting hydrated product will be in the form of a putty.

This putty may then be distributed in water to form a thin suspension of the hydroxides, after which the suspension is treated to separate the calcium compounds from the magnesium compounds by the use of either of the two methods hereinafter described. Before treating the suspension to separate the calcium compounds from the magnesium compounds, it is desirable to screen the suspension, as at 13, to remove the coarser particles, such as silica, iron, and the like, or to subject the suspension to a classifying action, as at 14, in a suitable classifying device, for example of the Dorr type, to remove from the suspension the objectionable coarser particles. If desired, the classification may be carried out at any appropriate subsequent step in the process.

The hydrated material in the form of a thin suspension is treated with carbon dioxide or with sugar to make possible the separation of the calcium compounds from the magnesium compounds. As the result of both processes, one type of compound is soluble while the other is insoluble, with the result that the two can be separated from each other.

In the first separation method, the carbonation may be carried out as indicated at 15, the carbon dioxide produced in the burning operation being utilized for this purpose. The carbonation to form the normal carbonates should be carried out with violent agitation in order to speed the reaction. The completion of reaction is indicated when the solution drops below pH 9.5. If desired, the carbonation may take place in a closed vessel and a pressure maintained thereon to speed up the reaction. In this case, as a pH of 9.5 is approached, the pressure is reduced to atmospheric so that solution by the formation of bicarbonate is not initiated. The product at this stage may then be dewatered by filtering, decanting, and the like, and stored; or it may be used in subsequent steps of the process, as soon as the normal carbonates are formed. The dewatering step, if practiced, is carried out to dissipate the heat of reaction before the formation of the bicarbonates, and to avoid the dilution of the bicarbonate solution to which the normal carbonates are brought in contact if the countercurrent process hereinafter described is employed.

The suspension containing the normal carbonates of calcium and magnesium, or the dewatered product resuspended in water, is treated with an additional amount of carbon dioxide to form magnesium bicarbonate without, however, forming calcium bicarbonate. Since the smaller particle size, the faster the rate of the reaction, it will be clear that the use of the rotary or other continuous flowing kiln in which a low temperature of burning is possible with its accompanying formation of small size particles is of advantage in this step also. The magnesium bicarbonate is soluble and, therefore, can easily be separated by filtration, or otherwise, from the insoluble calcium carbonate. Preferably, the formation of the magnesium bicarbonate is brought about so that the suspension of normal calcium and magnesium carbonates is treated with a solution of magnesium bicarbonate and carbon dioxide, the carbon dioxide reacting with the normal magnesium carbonate in the suspension to form magnesium bicarbonate. Thus, a screw conveying apparatus may be employed in which the normal carbonates are moved in one direction by the screw while the fresh solution containing carbon dioxide and containing no magnesium bicarbonate is admitted at the end of the apparatus opposite that at which the normal calcium and magnesium carbonates are admitted. In this manner, magnesium bicarbonate becomes dissolved in the solution containing the carbon dioxide so that the normal carbonates flow countercurrent to and are brought in contact with the solution containing carbon dioxide and a high concentration of magnesium bicarbonate.

This same type of countercurrent flow is also obtained when the formation of the magnesium bicarbonate is conducted in two or more receptacles in a cyclic operation in which carbon dioxide is first brought into contact with a suspension of normal carbonates in which a portion of the magnesium carbonate has been converted in a previous cycle into magnesium bicarbonate by carbon dioxide. Referring to the drawing, receptacles 16a and 16b illustrate this cyclic type of operation. If receptacle 16a contains the fresh suspension of the normal carbonates and receptacle 16b contains the suspension treated in a previous cycle, carbon dioxide is passed into receptacle 16b and the remaining magnesium values are removed by converting the magnesium carbonate of the suspension into magnesium bicarbonate. The solution containing magnesium bicarbonate is then passed after filtering or decanting to receptacle 16a and carbon dioxide is passed through a solution in that receptacle to form magnesium bicarbonate therein. The carbon dioxide is passed into the solution until it becomes saturated. The solution removed from receptacle 16a is ready for treatment to recover the magnesium values as magnesium carbonate as hereinafter described. The suspension of solids in receptacle 16b is substantially pure calcium carbonate and is available for use by the trade after drying. When the magnesium values have been extracted from the suspension in receptacle 16b and the calcium carbonate removed therefrom, receptacle 16b is supplied with fresh suspension from carbonating receptacle 15, and receptacle 16a then receives the initial treatment with carbon dioxide and the functions of the two receptacles are reversed. The cyclic operation is thereafter continued so long as there is a suspension of the normal carbonates obtained in receptacle 15 to be treated. In the drawing, the full lines represent the flow of carbonated material when the extractor 16a contains the fresh material and extractor 16b contains the material previously treated, in which case the full line from extractor 16b to 16a represents the flow of the solution used in treating the material in 16a. The dotted lines represent the conditions when 16b contains the fresh material.

If desired, the solution and suspended solids may be filtered at the end of each step of the cycle. The solution from the receptacle containing originally the partially treated suspension is passed to the receptacle containing the fresh suspension while the solids from the receptacle containing the fresh suspension originally are passed to the other receptacle for the initial treatment with carbon dioxide. In such an operation, the saturated solution containing the magnesium bicarbonate which solution is ready for the recovery of the magnesium values therefrom is furnished by the receptacle originally containing the fresh suspension while the calcium carbonate substantially free from magnesium compounds is removed from the receptacle originally containing the partially treated suspension.

It is composed of a series of operations so designed to carry out each required step thoroughly and completely, so that the material treated at that step can be thoroughly and completely treated at the following steps. It is also designed so that the maximum yield of the various products will be obtained, and in obtaining the maximum quantities of products they must be freed of impurities so that the quality of these several products is higher than made in other commercial magnesium extraction processes which use dolomite or other similar products.

The process consists in starting with a uniformly crushed dolomite of any size that will conveniently operate in the rotary kiln 10. The rotary kiln is operated in the usual manner and fired with any fuel that will supply sufficient heat to completely decompose the stone. If the firing takes place in a separate shell, the carbon dioxide evolved in the decomposition of magnesium containing stone will be pure carbon dioxide and can be collected and added to the carbon dioxide supply.

The product of this rotary kiln is then passed to a hydrator 12 where moisture is added to form a chemical compound of $Mg(OH)_2$ and $Ca(OH)_2$ at a temperature below the boiling point of water but sufficiently hot to completely hydrate the slow hydrating magnesium oxide.

This hydrated product and an excess of water, which was used to prevent the maximum temperature from rising above 100° C., are then passed through a screen 13 or a classifier 14 where other products which are not magnesium hydroxide or calcium hydroxide are separated.

The screened or classified hydroxides are then moved to a normal carbonator 15. In the normal carbonator the product is treated with carbon dioxide, which can be either a pure product from 10 or an impure product from 10 which contains flue gases. It is treated until all of the hydroxides have become carbonates, and this end point is determined by pH. When the pH drops below 7 all of the hydroxides have been carbonated.

The normal carbonates thus formed are passed to an extractor 16a where sufficient water is added, which contains magnesium bicarbonate and comes from 16b.

The extraction uses pure carbon dioxide coming from 19, and the process is carried out until the liquor is substantially saturated with magnesium bicarbonate, then passed to filter 17.

The solids remaining in the extractor 16a are then treated with fresh water and pure carbon dioxide from 19, and the process is continued until the solid material in the extractor no longer contains magnesium carbonate. The liquor from this product then passes to extractor 16b which in the meantime has been filled with a fresh charge from normal carbonator 15.

Another cycle of the same operation can start off with the normal carbonates from 15 being placed in 16b as just mentioned, and these treated with the liquor from 16a and fresh carbon dioxide, and this extraction carried until the liquor is substantially saturated with magnesium bicarbonate.

The saturated liquor is passed through the filter 17 and the solids are re-extracted with fresh water and carbon dioxide, and the extraction is continued until all of the solid magnesium has gone into solution.

The partially saturated liquor is then passed to 16a, which has a new charge of normal carbonates. The solid material from 16b is caught on the filter 17. The calcium carbonate is washed on this filter to supply pure calcium carbonate.

The liquor or filtrate from 17 goes to a turbulent precipitator where the material is agitated at such velocity that there will be substantially no precipitation on the heating surfaces.

The products from 18 will then pass to filter 19 where the carbon dioxide is recovered. Water is likewise recovered and passes over to 16a or 16b, and is the fresh water mentioned in the extraction. The solid magnesium carbonate from this filter is then passed to a dryer, which gives you substantially pure magnesium carbonate.

While in the cyclic processes described, the process has been illustrated by the use of only two receptacles, it is often advantageous to use three or more, in which case the solution passes from one receptacle to the other, and each receptacle in turn becomes the one from which the calcium carbonate substantially free from magnesium compounds is removed, and each in turn becomes the one from which the saturated solution of magnesium bicarbonate is obtained. The cyclic process described may advantageously be used irrespective of the type of equipment employed in burning the ore, but as indicated when the highest recovery possible is desired, the ore is burned in a rotary or other continuous flowing kiln.

The countercurrent extraction process described is a great improvement over the single extraction step previously used since in such a process it is not practical to remove all of the magnesia and calcium compound nor is it possible to have calcium-free magnesia. A recovery of 70% of the magnesia is considered a good yield in a single extraction step. In such a step, as the amount of magnesium oxide in the suspension to be treated increases the yield obtained decreases. On the other hand as the concentration decreases, the amount of calcium compound found in the separated magnesium compound increases.

By the process of the present invention in which low temperature burning and multiple extraction of the magnesium compound are employed, the yield is increased to more than 99.9%. As previously described, the process involves treatment of the previously treated suspension of normal carbonates with fresh carbon dioxide. This solution may become saturated with calcium bicarbonate, but since this liquor is then passed into contact with fresh normal carbonates, the calcium is precipitated as the amount of magnesium bicarbonate in the solution is increased. This is an important feature of the present process as heretofore it could not be accomplished successfully. An attempted solution of the problem resided in leaving much magnesium carbonate in the residue, for example in a typical residue from the usual single step process, there is found approximately 10%–11% of magnesium carbonate. This countercurrent process permits heavier loads of magnesium bicarbonate to be carried by the liquor especially at higher pressures than are now practical because of the calcium solubility. The heavier content of magnesium bicarbonate in the solutions permits greater yield from the apparatus, thus lowering the production cost. By precooling the water used for extraction to about 7° C., the solubility of the magnesium bicarbonate may be further increased. This precooling may take place by any of the common means of water cooling; for example, a vacuum jet with a booster may be used. To increase still further the solubility of the magnesium bicarbonate, the pressure may be raised by the carbon dioxide to at least 3 atmospheres and preferably 10 to 20 atmospheres, depending upon the equipment and the degree of purity of the magnesium carbonate desired.

After the formation of the magnesium bicarbonate, the solution of the product is separated from the insoluble calcium carbonate by filtration as at 17. The calcium carbonate is substantially pure and may either be directly dried to produce chalk or kiln-treated to produce a high grade calcium oxide.

The solution containing the magnesium carbonate removed from receptacle 16a or 16b is subjected to turbulent precipitation as at 18 in order to obtain the normal magnesium carbonate therefrom. Heretofore, the normal magnesium carbonate has not been obtained from dolomite or other high magnesium limestones since the processes previously used have resulted in the formation of magnesium basic carbonate. In accordance with the present invention, the turbulent precipitation of the magnesium bicarbonate solutions to form magnesium normal carbonate may be carried out in a number of ways. For example, it may be done by heating the kettle containing the magnesium bicarbonate solution and agitating the solution so that the entire solution is in constant random motion, or the liquor may be passed through a heat exchanger provided with baffles at a velocity sufficient to give the liquid turbulent motion. One of the advantages of forming normal magnesium carbonate resides in the fact that this oxide decomposes at 350° C., whereas the usual product, magnesium basic carbonate, is decomposed above 900° C., which means that a lighter oxide more reactive chemically is made by the process requiring less heat for decomposition. In addition, the normal carbonate is less soluble and hence better recoveries are possible. Furthermore, the precipitation of solids on the surfaces of the receptacles is reduced when the normal carbonate is formed which does not decrease the heat transfer capacity of the receptacles. The normal magnesium carbonate is also in larger crystalline form and more easily filtered.

A typical analysis (dry basis) of the products of the process where the countercurrent extraction was carried out at 3 atmospheres is:

|  | CaO | CaCO$_3$ | MgO | MgCO$_3$ | R$_2$O$_3$ | SiO$_2$ |
|---|---|---|---|---|---|---|
| Magnesium extract | .175 | .311 | 47.7 | 99.6 | .003 | Trace |
| Calcium residue | 54.78 | 98.22 | .014 | .028 | 1.00 | 0.50 |

The precipitated normal carbonate is filtered as at 19 preferably in a filter of such a character that carbon dioxide, liberated when the solution is delivered from the receptacle in which the normal carbonate is formed, is returned to the system, for example at 11. The filtrate is advantageously returned to the system at extractor 16a or 16b at the time when fresh water is required at that extractor, in order to avoid any magnesium losses. Magnesium basic carbonate may be obtained from the normal carbonate either before or after filtering by heating it without agitation with water under steam pressure at temperatures higher than 100° C. The normal magnesium carbonate may be dried as at 20 and thus made available to the trade or it my be processed further, if desired, to form other magnesium compounds by standard methods, for example pure magnesia, magnesium hydroxide, magnesium oxide, or dead burned magnesite.

Instead of subjecting the hydrated material obtained from the hydrator 12 to carbonation, it may be treated with a sugar either as directly obtained from the hydrator or after screening as at 13, or after classification as at 14. In this case, a sugar or a solution of a sugar such as sucrose, dextrose, maltose raffinose, or other sugar may be added to the hydrated material in the vessel 21, termed the saccharifying vessel, sufficient sugar being added to convert the calcium hydroxide present into a soluble calcium-sugar compound, such as calcium sucrate. The resulting product containing soluble calcium compound and magnesium hydroxide may be classified as at 22 if it has not previously been so treated. A Dorr classifier is applicable for use. The classifier will remove calcium carbonate and impurities such as iron and aluminum oxides, sand and the like. The soluble calcium-sugar compound is removed from the insoluble magnesium hydroxide by filtration as at 23, and the soluble calcium compound may thereafter be converted into an insoluble compound as at 24 by using carbon dioxide resulting from the kiln-treatment of the ore. The resulting solution after separation of the calcium carbonate therefrom by filtration as at 25 contains sugar and may be returned to the sugar storage tank as at 26. The calicum carbonate may be dried as at 27. The magnesium hydroxide is washed on the filter 23, and the solution used as a washing agent may be evaporated as at 28 and the extract returned to the system at any appropriate place to recover any magnesium values that may be found in the wash water, for example it may be added to the sugar supply tank 26. The washed magnesium hydroxide may then be dried as at 29 or it may be carbonated to the normal carbonate as at 30 or further carbonated to the bicarbonate if desired. The magnesium carbonate may then be filtered as at 19 and dried as at 20, or the bicarbonate may be subjected to turbulent motion as at 18 to form the normal carbonate and the product thereafter filtered and dried as at 19 and 20, respectively. The magnesium hydroxide or the resulting carbonate or bicarbonate may be used in producing chemically pure magnesium products in accordance with standard methods.

It is to be noted that each of the two alternative processes which may be followed after the hydration of the burned material advantageously employs a uniform product which is lightly burned, that is burned to an extent in which it has little or no dead burned material. The use of a rotary kiln in which the burning can be closely controlled is recommended for use. It will be understood, however, that other methods of burning may be employed, if desired.

We claim:

1. The process of separating magnesium compounds from an ore containing magnesium carbonate and calcium carbonate, which comprises continuously feeding into and removing from a kiln said ore and during said flow of ore burning said ore to produce magnesium oxide and calcium oxide substantially free from dead burned particles and from unconverted carbonates, bringing said burned ore into contact with water and hydrating the magnesium oxide and calcium oxide thereof by maintaining the mixture of water and oxides at a temperature above appproximately 75° C. for a time sufficient to hydrate substantially completely the said oxides, adding to said hydrated material a sugar to form a soluble calcium-sugar compound, and thereafter filtering said solution to separate the soluble calcium-sugar compound from the insoluble magnesium hydroxide.

2. The process of separating magnesium compounds from a mixture of normal calcium and normal magnesium carbonates formed by the carbonation of calcium and magnesium hydroxides which comprises as a first step treating with carbon dioxide an extracted suspension of said normal carbonates in water, from which a portion of the magnesium carbonate has been removed by conversion in a previous process into magnesium bicarbonate, until substantially all of the normal magnesium carbonate has been converted into magnesium bicarbonate, separating the solution of magnesium bicarbonate from the solids associated therewith, bringing the solution from said first step into contact in the presence of carbon dioxide with a suspension of fresh normal carbonates until the said solution becomes substantially saturated with magnesium bicarbonate, separating said substantially saturated solution of magnesium bicarbonate from the normal carbonates suspended therein, and thereafter repeating the said process using the separated normal carbonates from said last-mentioned step in the first step of said process.

3. The process of separating magnesium compounds from an ore containing magnesium carbonate and calcium carbonate which comprises continuously feeding into and removing from a kiln said ore and during said flow of ore burning said ore to produce magnesium oxide and calcium oxide substantially free from dead burned material and from unconverted carbonates, bringing said burned ore into contact with water and hydrating the magnesium oxide and calcium oxide thereof by maintaining the mixture of water and oxides at a temperature above approximately 75° C. for a time sufficient to hydrate substantially completely the said oxides, carbonating said hydrated product to form normal calcium and magesium carbonates, further carbonating said normal carbonates in a process comprising as a first step treating with carbon dioxide an extracted suspension of said normal carbonates, from which a portion of the magnesium carbonate has been removed by conversion in a previous process into magnesium bicarbonate, until substantially all of the normal magnesium carbonate has been converted into magnesium bicarbonate, separating the solution of magnesium bicarbonate from the solids associated therewith, bringing the solution from said first step into contact in the presence of carbon dioxide with a suspension of fresh normal carbonates until the said solution becomes substantially saturated with magnesium bicarbonate, separating said substantially saturated solution of magnesium bicarbonate from the normal carbonates suspended therein, and thereafter repeating the said process using the separated normal carbonates from said last-mentioned step in the first step of said process.

4. The process of separating magnesium compounds from an ore containing magnesium carbonate and calcium carbonate, which comprises continuously feeding into and removing from a kiln said ore and during said flow burning said ore to produce magnesium oxide and calcium oxide substantially free from dead burned particles and from unconverted carbonates, bringing said burned ore into contact with water and hydrating the magnesium oxide and calcium oxide thereof by maintaining the mixture of water and oxides at a temperature above approximately 75° C. for a time sufficient to hydrate substantially completely the said oxides, classifying said hydrated material to separate contaminating materials therefrom, carbonating said hydrated product to form normal calcium and magnesium carbonates, further carbonating said normal carbonates in a process comprising as a first step treating with carbon dioxide an extracted suspension of said normal carbonates, from which a portion of the magnesium carbonate has been removed by conversion in a previous process into magnesium bicarbonate, until substantially all of the normal magnesium carbonate has been converted into magnesium bicarbonate, separating the solution of magnesium bicarbonate from the solids associated therewith, bringing the solution from said first step into contact in the presence of carbon dioxide with a suspension of fresh normal carbonates until the said solution becomes substantially saturated with magnesium bicarbonate, separating said substantially saturated solution of magnesium bicarbonate from normal carbonates suspended therein, and thereafter repeating the said process using the separated normal carbonates from said last-mentioned step in the first step of said process.

5. The process of claim 2 wherein the substantially saturated solution of magnesium bicarbonate is heated and is vigorously agitated during said heating to precipitate magnesium carbonate.

6. The process of claim 3 wherein the substantially saturated solution of magnesium bicarbonate is heated and is vigorously agitated during said heating to precipitate magnesium carbonate.

PHILIP SADTLER.
SAMUEL S. SADTLER.